Feb. 18, 1941.  W. H. MYERS  2,232,663
RADIO CONTROL APPARATUS
Filed March 6, 1940
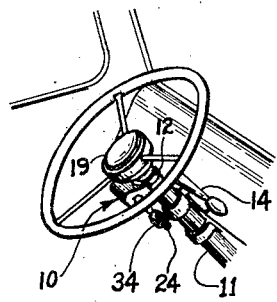
FIG. 1.
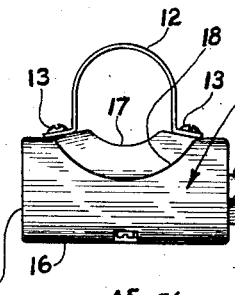
FIG. 2.
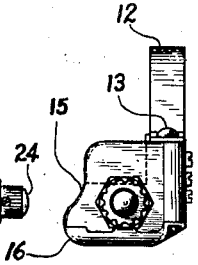
FIG. 3.
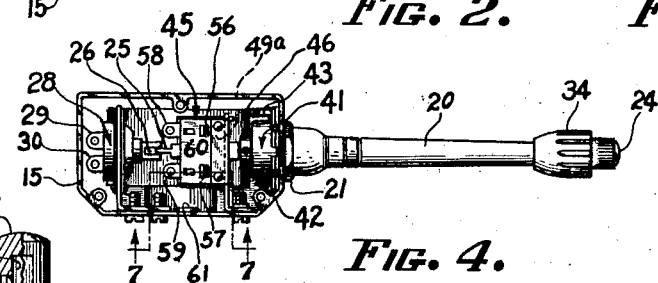
FIG. 4.
FIG. 7.
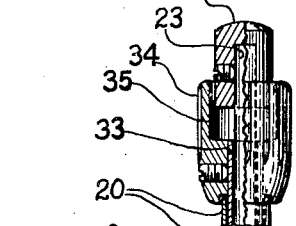
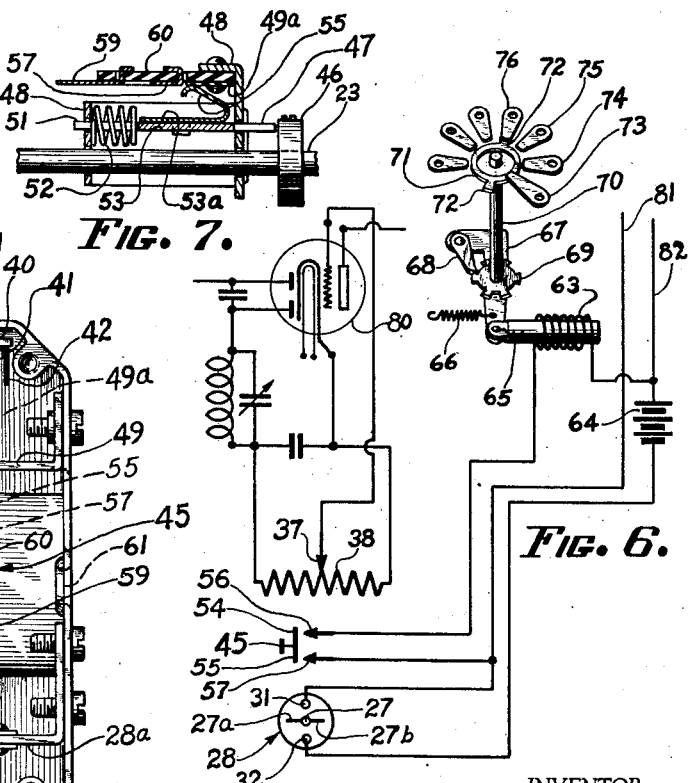
FIG. 6.
FIG. 5.
INVENTOR.
William H. Myers.
BY Alden D. Redfield
ATTORNEY.

Patented Feb. 18, 1941

2,232,663

UNITED STATES PATENT OFFICE 2,232,663

RADIO CONTROL APPARATUS

William H. Myers, Detroit, Mich., assignor to The Crosley Corporation, Cincinnati, Ohio, a corporation of Ohio Application March 6, 1940, Serial No. 322,521

8 Claims. (Cl. 250—20)

This invention relates to radio control apparatus and is particularly concerned with a control in which various fundamental controlling means of a radio receiver such as turning the set off and on, tuning the set and adjusting the volume may be operated by manuals located in close proximity with one another by imparting a limited rotary or a translatory motion to said manuals or both.

The invention may be used to control various kinds of electrical equipment but is particularly useful in connection with the control of radio receivers, and in the illustrative embodiment hereinafter alluded to the invention is described as it is embodied in the control of radio receivers for motor vehicles.

In controlling the operation of radio receivers, it is often desirable to concentrate the means by which the controlling devices are operated at a single point and arranging said means so that a predetermined movement may be imparted to one or more manuals located at that point in order to effect a given controlling operation. Such a control is well adapted for use with radio receivers for automotive vehicles wherein it is highly desirable that the controlling manuals be within easy reach of the operator and at a predetermined point where the operator will know he can always locate them and from which he can easily and quickly effect the desired controlling function.

A feature of the invention is the concentration of controlling means at such a point and the arrangement of such means so that either a rotary or a translatory movement may be imparted to such manuals in order to cause the receiver to perform the desired functions. A particular feature of the invention as applied to radio receivers for motor vehicles is that it provides means for the operator to control the receiver without removing hands from the steering wheel.

Objects of the invention include the concentration of control at a point, the provision of at least two manuals at such point adapted for predetermined limited movement to effect the desired operation and to provide means wherein such movement accurately and positively effects the desired controlling function.

The novel features that I consider characteristic of my invention are set forth in the appended claims. The invention itself, however, both as to its organization and its method of operation together with additional objects and advantages thereof will best be understood from the following description of a specific embodiment when read in connection with the accompanying drawing, in which:

Figure 1 is a perspective view of the steering wheel of a motor vehicle to which an illustrative embodiment of the invention is secured.

Figure 2 is a plan view of a device embodying the invention adapted to be secured to the steering column of a motor vehicle.

Figure 3 is an end elevation of the device as shown in Figure 2.

Figure 4 is a side elevation of Figure 2 with cover plate removed.

Figure 5 is an enlarged view partly in section and partly in elevation showing the interior of the device shown in the preceding figures, the section being taken on a plane slightly below that defining the cover plate.

Figure 6 is a diagrammatic view showing how the various mechanical movements imparted to the control members of the illustrated device control the functioning of a radio receiver, and Figure 7 is an enlarged section taken along line 7—7 of Fig. 4.

Briefly, the invention may be described as comprising the provision of a mechanical controlling device preferably housed within a casing and provided with a pair of closely related shafts 23 and 39 at the ends of which manuals 24 and 34 are disposed in an easily accessible location and in cooperative relationship. By turning or pushing one or more of these manuals the desired controlling functions of the set are effected.

Referring to Figures 1 to 3, the controlling mechanism as shown generally at 10 may be secured to the steering column 11 of a motor vehicle by a strap 12 disposed around said column and secured to the casing 15 of the device as by screws 13. The entire device may be mounted so that the housing 20 for its operating shafts is in parallel relationship with the hand-operated gear shift lever 14 of the vehicle, as shown in Figure 1. The mechanism may comprise a casing 15 provided with a removable cover 16, suitable recessed portions 17 and 18 being provided in order to enable the device to fit closely against the steering column and to permit it to be brought up closely against the underface of the casing 19 disposed centrally of the steering wheel. By this arrangement the device is well adapted for hand operation as it is kept well within the periphery of the steering wheel proper and sufficiently elevated to be maintained out of the way of the limbs of the operator.

Referring now to the more detailed views, a housing may be secured to the casing 15 as by hexagonal flange 21 screwed into a nipple 22 having an enlarged lower end adapted to abut the interior of the casing. Within the housing may be disposed a shaft 23 which I shall call a switch shaft and a tubular shaft 33 which I shall call a volume control shaft. On the outer end of the switch shaft is secured a manual 24 and its extreme inner end is provided with a fin 25 adapted to extend part way into a slot 26 of a switch shaft 27 secured to a single pole single throw rotary switch 28 having connecting lugs 29 and 30. The switch may be secured to a bracket 28ᵃ in turn secured to casing 15. The interior of the switch is shown diagrammatically in Figure 6 and consists of fixed contacts 31 and 32 connected to the power input of the set and a movable member adapted to rotate with shaft 27 and having contacts 27ᵃ and 27ᵇ. Turning of the switch from the "off" to the "on" position aligns the movable contacts with the fixed contacts and connects the set with the power supply so as to place it in operation.

The outer or volume control shaft 33 is shown as tubular in nature and at its termination carries an insulating washer 36 to which is secured a volume control slider 37 resiliently held against a resistor strip 38 of annular configuration and constructed in a manner well known in the art. The resistor strip 38 is mounted on an insulating washer 39 secured to a base 40 which may be mounted on nipple 22. A housing 41 may be provided to enclose the rheostat structure above described, by providing suitable lugs turned over the rear face of the base 40. It will be observed that turning of the manual 34 which is secured to the shaft 33 will cause the slider 37 to rotate around the resistor strip in order to vary the resistance in the circuit within which the rheostat is connected. Connecting lugs 42, 43 and 44 are connected to the resistor strip and slider in a manner well known to the art, so that the resistor may be connected into the desired circuit through appropriate wires.

Intermediate the ends of the shaft 23 is provided a collar 46 for operating a tuning device indicated generally at 45. This comprises a slide member disposed below collar 46, which member may consist of a rectangular metallic member 53 having ears 47 and 51 adapted and arranged to reciprocate within housing 48 when moved by the collar 46 as the switch shaft is pushed inwardly (or downwardly as in Fig. 5) against the action of spring 52. Secured to member 53 is a contact plate 53ᵃ of conductive metal having a pair of contacts 54 and 55 bent over in substantial parallel relationship to the plate 53ᵃ and arranged in yielding contact with a strip of insulation 49ᵃ disposed underneath insulating piece 60. (See Figures 4, 5 and 7.) Between the insulation strip 49ᵃ and a portion of the piece 60 are provided contact strips 56 and 57. The ends of these strips are provided with lugs 58 and 59 for connection with the radio receiver. The entire structure is housed within a casing 48 and secured to a bracket 49 in turn secured to the housing 15.

When the manual 24 is pushed inwardly the collar 46 engages ear 47 and pushes the plate 53 inwardly against the action of spring 52. At the same time the contacts 54 and 55 ride off the insulating strip 49ᵃ and onto the contact strips 56 and 57. This connects the contacts 56 and 57, thereby completing a circuit including the same and conductive metal plate 53ᵃ. Lead wires from lugs 58 and 59 and also from the previously described lugs 42 to 44 of the volume control and 29 and 30 of the "on" and "off" switch, may be led through the casing 15 through an opening 61 and connected to the appropriate devices and circuits of the radio receiver.

As indicated diagrammatically in Figure 6, power from battery 64 is applied to the receiver through lines 81 and 82. When the manual 24 is turned, contact is made within the rotary switch 28 as previously described and the set is connected to power. Assuming that the connected tuning circuit is already properly tuned the set operates as soon as the tubes warm up. In the event it is desired to tune to another station, the manual 24 is depressed in order to effect a movement of translation of the shaft 23 which is permitted by reason of the fact that the end of shaft 25 may move into the slot 26. This movement of translation actuates tuning device 45 by moving the member 53 inwardly (or downwardly, see Figure 5) and the contacts 54 and 55 are connected to contact strips 56 and 57. (Figures 4, 5 and 7.) This closes the circuit through solenoid 63 and pulls the plunger 65 against the action of the spring 66 and moves a suitably mounted bell crank 67. A pawl 68 mounted on said crank moves ratchet wheel 69 on shaft 70 a predetermined amount and this causes one of the movable contacts 72 to connect a differently tuned circuit between contact 73 which bears on ring 71 and one of the fixed contacts 74, 75, 76, etc.

It will be understood that the radio receiver is provided with pretuned circuits each of which is connected with the contact 73 and one of the contacts 74, 75, 76, etc., so that each step to which the ratchet 69 is advanced connects a differently tuned circuit between contact 73 and some other contact. By this means a perdetermined tuned circuit may be closed by a predetermined number of translatory movements imparted to shaft 23 resulting in an equivalent number of solenoid operations and rotatory movements of the shaft 70.

The resistor 38 may be connected in a circuit including a duplex diode triode tube 80 as indicated in Figure 6, which illustrates a conventional means of controlling volume. The resistor is connected to act as a potentiometer or signal divider and is connected with the rectifying diode of the tube. Circuits such as that shown in Figure 6 adapted to permit volume control are well known in the art and form no part of the present invention.

It will be noted that the invention is not limited to use with automotive radio receivers nor to the tuning of the receiver by switching in various preset tuning circuits. The solenoid device may be utilized in other ways such as actuating mechanical tuning units in known manner. Instead of concentric or encompassed shafts one or more Bowden wires may be used, arranged so their ends are closely adjacent each other and arranged to carry suitable cooperating manuals. Of course the manuals described need not be hand operated means but may be foot, knee or limb-operated members adapted and arranged for operation by the foot, knee or other limb. These and other variations and modifications of the invention will readily appear to persons skilled in the art and may be made within the teaching of the principles embodied in the present disclosure.

Having thus described my invention, I claim:

1. In a radio receiver having a number of tuning circuits, a pair of shafts one disposed within the other, a manual element disposed at the end of each shaft and in close proximity with each other, a pair of switches operatively connected to the other end of one of said shafts, a rheostat operatively connected to the other end of the other of said shafts, and connections whereby one of said switches operates to turn the receiver on and off and the other of said switches serves to select one of said number of tuning circuits.

2. In a radio receiver having a number of tuning circuits, a pair of shafts one disposed within the other, a manual element disposed at the end of each shaft and in close proximity with each other, a pair of switches operatively connected to the other end of one of said shafts, a rheostat operatively connected to the other end of the other of said shafts, connections whereby one of said switches operates to turn the receiver on and off and the other of said switches serves to select one of said number of tuning circuits, means for connecting said rheostat to said receiver to control the volume of said receiver.

3. An automobile radio receiving system comprising a receiving set having a plurality of presettable means for presetting said set to receive a signal from any one of a plurality of transmitting stations, selecting means for selecting a desired one of said presettable means, and means for operating said selecting means to select any one of said presettable means including a pressure operated device having a predetermined translatory movement and being fixed at a predetermined point where the operator of the automobile can quickly and easily locate and operate the same by the application of pressure while maintaining his hands on the steering wheel, whereby the operator may maintain substantially uninterrupted control of the automobile.

4. An automobile radio receiving system comprising a receiving set having a plurality of presettable means for presetting said set to receive a signal from any one of a plurality of transmitting stations, selecting means for selecting a desired one of said presettable means, and means for operating said selecting means to select any one of said presettable means including a solenoid for actuating said selecting means and a pressure operated switch for controlling the operation of said solenoid, said switch having a predetermined translatory movement and being fixed at a predetermined point where the operator of the automobile can quickly and easily locate and operate the same by the application of pressure while maintaining his hands on the steering wheel, whereby the operator may maintain substantially uninterrupted control of the automobile.

5. In an automobile radio receiving system, a receiving set having a plurality of presettable means for presetting said set to receive a signal from any one of a plurality of transmitting stations, a step-by-step rotary selecting device for selecting a desired one of said presettable means, and means for rotating said device in steps to select any one of said presettable means including a pressure operated device having a predetermined translatory movement and being fixed at a predetermined point where the operator of the automobile can quickly and easily locate and operate the same by the application of pressure while maintaining his hands on the steering wheel, whereby the operator may maintain substantially uninterrupted control of the automobile.

6. A control apparatus for a radio receiver comprising an operating member adapted and arranged for effecting a predetermined translatory movement on depression thereof and a predetermined rotary movement on rotation thereof, an electromagnetically actuated step-by-step tuning mechanism for said receiver, and means operatively connecting said mechanism with said operating member so that it may be advanced from one tuning position to another solely by depression of said member to cause said translatory movement to take place, and an on-and-off switch connected to said operating member so that the receiver may be turned on and off by rotation of said member.

7. A control apparatus for a radio receiver comprising a pair of operating members one of which is adapted and arranged for effecting a predetermined translatory movement on depression thereof and a predetermined rotary movement on rotation thereof and the other of which is adapted and arranged for effecting a rotary movement only, an electromagnetically actuated step-by-step tuning mechanism operatively connected with said first operating member so that such mechanism may be advanced in steps solely by depression of said member sufficient to cause said translatory movement to take place, and an on-and-off switch operatively connected to said first operating member so that the receiver may be turned on and off by rotation of said member, and a volume control operatively connected to said second operating member.

8. A control apparatus for a radio receiver comprising an operating member adapted and arranged for effecting a predetermined translatory movement on depression thereof and a predetermined rotary movement on rotation thereof, an electromagnetically actuated step-by-step tuning mechanism for said receiver, and means operatively connecting said mechanism with said operating member so that it may be advanced from one tuning position to another solely by depression of said member to cause said translatory movement to take place, and a device for controlling the operation of said receiver connected to said operating member so that the receiver may be controlled by rotation of said member.

WILLIAM H. MYERS.